United States Patent [19]

Kothmann

[11] 4,383,009
[45] May 10, 1983

[54] LOW HYDROSTATIC HEAD ELECTROLYTE ADDITION TO FUEL CELL STACKS

[75] Inventor: Richard E. Kothmann, Churchill Boro, Pa.

[73] Assignee: The United States of America as represented by the United States Department of Energy, Washington, D.C.

[21] Appl. No.: 303,810

[22] Filed: Sep. 21, 1981

[51] Int. Cl.³ .............................................. H01M 8/24
[52] U.S. Cl. ..................................................... 429/39
[58] Field of Search ............................. 429/34, 38, 39

[56] References Cited

U.S. PATENT DOCUMENTS

| | | | |
|---|---|---|---|
| 3,489,614 | 1/1970 | Tomter | 429/38 |
| 3,634,139 | 4/1969 | Reiser | 429/34 |
| 3,905,832 | 9/1975 | Trocciola | 429/34 |
| 3,926,676 | 12/1975 | Erie et al. | 429/38 |
| 4,168,319 | 9/1979 | Buzzelli | 429/38 |
| 4,310,605 | 1/1982 | Early et al. | 429/39 |

*Primary Examiner*—Donald L. Walton
*Attorney, Agent, or Firm*—W. E. Otto; Z. L. Dermer

[57] ABSTRACT

A fuel cell and system for supply electrolyte, as well as fuel and an oxidant to a fuel cell stack having at least two fuel cells, each of the cells having a pair of spaced electrodes and a matrix sandwiched therebetween, fuel and oxidant paths associated with a bipolar plate separating each pair of adjacent fuel cells and an electrolyte fill path for adding electrolyte to the cells and wetting said matrices. Electrolyte is flowed through the fuel cell stack in a back and forth fashion in a path in each cell substantially parallel to one face of opposite faces of the bipolar plate exposed to one of the electrodes and the matrices to produce an overall head uniformly between cells due to frictional pressure drop in the path for each cell free of a large hydrostatic head to thereby avoid flooding of the electrodes. The bipolar plate is provided with channels forming paths for the flow of the fuel and oxidant on opposite faces thereof, and the fuel and the oxidant are flowed along a first side of the bipolar plate and a second side of the bipolar plate through channels formed into the opposite faces of the bipolar plate, the fuel flowing through channels formed into one of the opposite faces and the oxidant flowing through channels formed into the other of the opposite faces.

10 Claims, 6 Drawing Figures

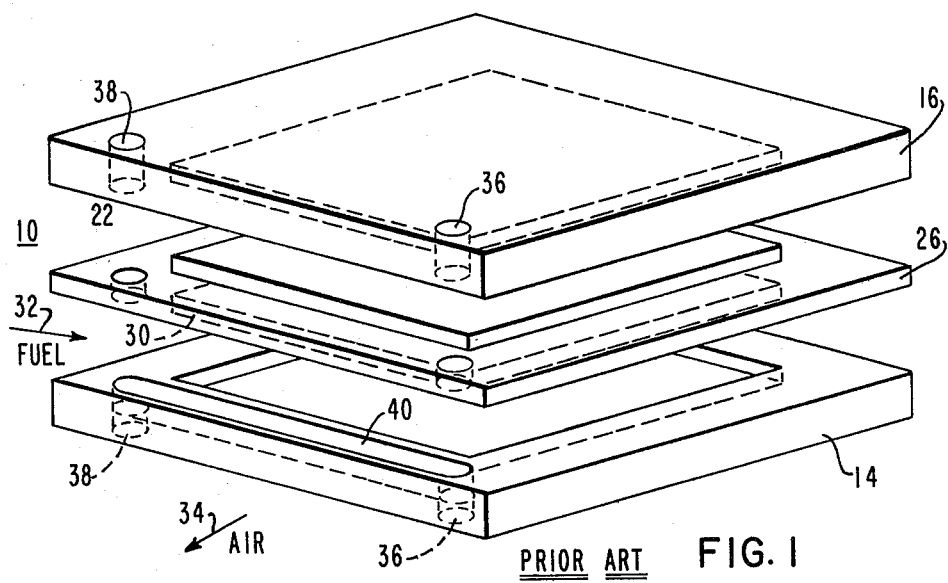
PRIOR ART FIG. 1
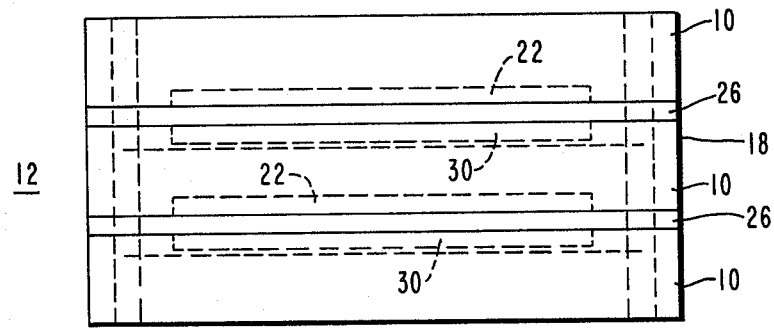
PRIOR ART FIG. 2

LOW HYDROSTATIC HEAD ELECTROLYTE ADDITION TO FUEL CELL STACKS

GOVERNMENT CONTRACT

The invention disclosed herein was made or conceived in the course of, or under, a contract with the United States Government identified as NO. DEN3-161.

CROSS REFERENCE TO RELATED APPLICATION

This application is related to a related application and makes use of the disclosure concerning a patent application directed to Control of Electrolyte Fill to Fuel Cell Stack designated and identified by Ser. No. 303,809 now U.S. Pat. No. 4,366,211 and invented by William Pollock and is known to the inventor of the subject matter of the present application filed concurrently herewith. The disclosure of the aforesaid application identified as Ser. No. 303,809 is incorporated herein by reference as the disclosure as well as the prior art referred to therein is related to the subject matter of the present application.

BACKGROUND OF THE INVENTION

1. Field of the Invention

This invention relates to addition and replenishment of electrolyte to a fuel cell stack under controlled conditions, and more particularly to addition and replenishment of a liquid electrolyte in a manner which alleviates flooding of the fuel cell electrodes.

Each of the individual cells forming the fuel stack utilizes an electrolyte which is intended to fill up a porous matrix for the saturation thereof and to keep the porous matrix saturated as well as to keep the remaining area around the matrix wetted to maintain the matrix in a state of electrolyte-wetted condition.

The invention provides for an acid channel arrangement which permits acid feed to a large number of cells without producing a large hydrostatic head which could cause flooding of electrodes. A series of back and forth flow arrangements distributes the overall head generally uniformly between cells due to frictional pressure drop in the channel for each cell.

With any fuel cell stack, the porous matrix of the fuel cell must be saturated with acid electrolyte to transport ions and to provide a seal which prevents mixing of the reacting gas streams. Even if wet matrix assembly procedures are used, acid must be added after some period of operation to replace losses by evaporation to the gas streams.

2. Description of the Prior Art

The prior art in general has been discussed in copending application Ser. No. 303,809. However, for the sake of completeness, the disclosure of the aforesaid application is incorporated by reference. Nevertheless, it should be noted that in the general prior known fuel cell stacks, acid in an acid fuel cell having two electrodes is contained in a thin porous member which is referred to as the matrix. The matrix is positioned between the anode and cathode electrodes, which in turn are positioned between a pair of bipolar plates; for purposes of description, the anode-matrix-cathode forms a first sandwich construction and the two bi-polar plates with the first sandwich construction therebetween forms a second sandwich construction. Once the cell is assembled and forms part of the fuel stack, acid additions to the matrix form an acid reservoir channel. There are many presently known methods and systems.

In accordance with a heretofore known method and system of adding electrolyte or acid to the fuel cell stack, acid addition utilizes acid channels in the bipolar plates which supply acid to one edge of the matrix of each cell in the stack. In order to apply the same hydrostatic head of acid to each matrix, the stack must be arranged with the bipolar plates in a vertical plane with acid at the bottom edge of the plates. Wicking must then be accomplished against the gravity feed which results in a slow wicking process. Structurally, it is desirable for tall stacks to be operated with plates in a horizontal plane. Thus re-wicking requires removal of the stack from operation to lay it on its side.

The presently used acid addition channel configuration is shown in FIGS. 1 and 2, and is labelled as prior art. The portion of the bipolar plate with acid channels and plate to plate holes is shown in FIG. 1. The stack arrangement is shown in FIG. 2.

U.S. Pat. No. 3,926,676 to Frie et al. is concerned with a uniform supply of electrolyte to all fuel cells of a battery. Electrolyte is supplied through inlets at the bottom of the battery and pumped upwardly to the top and out of outlets thereat. The outlet has a larger cross-sectional area than the inlet. Electrolyte flow is effected in parallel to all cells and the pumping pressure is provided to supply and discharge passages communicating with the inlet and outlet, respectively, so that substantially the same operational pressure difference prevails between the supply passage and the respective discharge passage of each of the electrolyte chambers.

U.S. Pat. No. 3,905,832 to Trocciola discusses venting, but the only venting here concerned is the removal of excess air and impurities through venting.

U.S. Pat. No. 4,168,319 to Buzzelli discloses the use of a pump at the outlet to pull the electrolyte out. Here also, the cross-section of the electrolyte outlets is larger than the cross-section of the inlets. Uniformity of electrolyte supply is obtained by pumping the electrolyte out of the cell.

It is therefore an object of the invention to provide a fuel cell which forms part of a fuel cell stack to provide for an acid or electrolyte channel arrangement which permits the addition of electrolyte in the horizontal planes.

A further object of the invention is to provide for the acid addition to a fuel cell stack during operation.

Yet another object of the invention is to provide for the addition of and to the fuel cell stack of electrolyte without moving the stack from its operating position.

Another object of the invention is the provision of an acid addition arrangement which permits acid to be supplied to the matrices of a large number of fuel cells in a stack with horizontal cells without exceeding an allowable hydrostatic head which would cause flooding.

SUMMARY OF THE INVENTION

Pursuant to the teachings of the invention, an electrolyte or acid channel arrangement is provided which permits the addition of electrolyte to the fuel cell stack with the electrodes in a horizontal plane. For this purpose, the fuel cell stack is provided with electrolyte or acid channels with a small continuous flow of acid during wicking or re-wicking. The acid path proceeds alternately from side to side of the plates or electrodes.

The matrix is preferably on the bottom side of the channel so that it will be wet even though the channel does not run full of acid. The channel can also be on top of the matrix, and the cell can be operated "upside-down" so that wetting takes place by a combination of capillary action plus surface tension.

While it is preferred to have the matrix at the bottom of the acid channel arrangement, the fuel cell in accordance with the teachings of the invention can be manufactured with the matrix above the acid channel. Also, when the fuel cell is made with the matrix above the acid channel, it is possible to operate the cell in what shall be defined as an upside-down condition. For this purpose, the anode electrode, cathode electrode and matrix have a sandwich construction, and the designation anode and cathode for the electrode is based upon the fuel and oxidant feeds. Specifically, the fuel is fed adjacent to the anode, and the oxidant is fed adjacent to the cathode. While the electrodes can be specifically designed for optimum operation to operate as a cathode or an anode depending upon the alloying elements or metals from which they are constructed, the fuel cell can be reversed so that the anode performs the function of the cathode, and the cathode performs the function of the anode. What controls the function of the electrode as either a cathode or an electrode is the pathway of fuel flow and oxidant flow. The fuel always flows adjacent to the anode, and the air or oxidant always flows adjacent to the cathode. Therefore, if the fuel cell is turned upside-down, and, for example, the fuel and oxidant paths are interchanged, then the electrode which formerly performed the function of a cathode performs the function of an anode, and the anode now performs the function of the cathode.

For purposes of designation, it should be noted that in the convention used, current flows from the anode to the cathode internally of the fuel cell and externally of the fuel cell from the cathode to the anode.

The matrix generally has the characteristics of a blotter so that the matrix tends to absorb and attract the acid. The matrix may be considered to be an acidophylic material because its surface structure is somewhat porous and it is, for example, formed from a graphite material, such that the acid tends to be attracted to and wet the matrix. Hence, when the matrix is wetted from below, the matrix is wetted by a combination capillary action and surface tension.

Accordingly, the oxidant can be above or below the matrix, and the electrolyte acid channel can be above or below the matrix.

When using the cell in an upside-down condition, it is important that there be no vent, or that if a vent is provided, it be adequately blocked-off to avoid loss of the acid electrolyte.

When filling the fuel cell, it is desirable to have a vent so that filling of the acid channel can take place at a very rapid rate. If no vent is provided, the rate of filling is decreased, and it may be desirable to eliminate the vent if it is desired to make a fuel cell which can be interchangeably operated and to reverse the operating characteristics of the electrodes. The electrolyte is applied from the top of the cell and flows to the bottom, and in accordance with the teachings of the invention, the electrolyte flows in a serpentine or back and forth fashion.

Flow of the electrolyte preferably takes place firstly in a vertical direction, into the first cell, then in a horizontal direction in the acid channel of the first cell, either above or below the matrix, then again vertically into the next adjacent or second cell, and then again horizontally in a direction parallel or substantially parallel to the first-mentioned horizontal direction and in a counter-current or opposite direction in the acid channel to the first horizontal direction, and then vertically into the next adjacent cell or third cell. Flow of the electrolyte in the third cell follows the flow in the first cell, and flow of the electrolyte in the fourth or next adjacent cell follows the flow in the second cell, and the sequence constantly repeats itself for the following adjacent cells.

Bubbles accumulate along the path, and for this reason it is desirable to have a vent to eliminate or decrease the formation of bubbles. When the width of the exit opening to exhaust electrolyte from any cell is made larger than the depth of the acid channel, the effect of surface tension is minimized.

In an exemplary fuel cell stack, the fuel and air paths can start from the same vertical side of the bipolar plate but on opposite horizontal faces thereof and exit together at the opposite vertical side with the flow paths crossing each other as they proceed from one side to the other. It is preferred, however, to have the fuel and oxidant paths to start from oppositely facing sides of the bipolar plate and on opposite horizontal faces thereof and exit from the side opposite to the starting side with the flow paths crossing each other as they proceed from one side to the other. For this purpose, the air path starts off at one side with a first base in the direction of air flow entry, then bends at substantially 90° to form the air leg and then is connected with a second base for exit of the air the opposite side. The fuel path starts off with a first base at the opposte side, then bends at substantially 90° to form the first leg which crosses the air leg and then exits through a second base at the one side to provide for complete counter-current flow of the air or oxidant fuel during the entire flow of the fuel and oxidant. Other oxidant and fuel flow arrangements are equally compatible with the disclosed systems.

To these ends, the invention consists in a system for supplying electrolyte, as well as fuel and an oxidant to a fuel cell stack having at least two fuel cells, and preferably a plurality of horizontally oriented cells, each of which have a pair of spaced electrodes and a matrix sandwiched therebetween, with fuel and oxidant channels formed in a bipolar plate separating each pair of adjacent fuel cells and an electrolyte fill path for adding electrolyte to the cells and wetting the matrices, together with the flowing of electrolyte through the fuel cell stack in a serpentine or back and forth fashion in a path substantially parallel to one face of opposite faces of each bipolar plate exposed to one of the electrodes and matrices. Further, fuel and oxidant are passed or flowed from a first side or edge of each bipolar plate to a second side of the bipolar plate through channels formed into opposite faces of the bipolar plate, the fuel flowing through channels formed into one of the opposite horizontally oriented faces and the oxidant flowing through channels formed into the other of the opposite horizontally oriented faces.

In the exemplary system, the fuel channels and the oxidant channels each start from the first side and terminate at the second side and cross each other between the sides such that the fuel and the oxidant paths flow initially upon entering the fuel cell stack in a parallel direction and exit from the fuel cell stack in a parallel direction and flow cross-current to each other between the entry into and exit from the fuel stack.

The invention is also directed to a fuel cell stack formed from two or more fuel cells each of which includes the electrolyte flow path, a pair of electrodes, and an electrolyte absorbing matrix therebetween in a sandwich-type construction, a bipolar plate in common between each two adjacent fuel cells, and, in the exemplary embodiments, the fuel path and the oxidant path each comprise at least one channel or flow path formed into the bipolar plate extending from a first side thereof to a second side thereof opposite to said first side, each said channel having an L-shape with a common leg and two bases connected at opposite ends of the common leg. The electrolyte flow path includes an electrolyte channel formed into a face of each of the bipolar plates facing the matrix.

Other objects, advantages and the nature of the invention will be readily appreciated from the detailed description of the invention with the figures of the drawings.

BRIEF DESCRIPTION OF THE DRAWINGS

FIG. 1 is a perspective view of a single fuel cell with portions omitted for clarity showing the prior art, with the shims omitted, but showing the fill holes;

FIG. 2 is an elevational view of a fuel cell stack with portions omitted for clarity employing the fuel cell of FIG. 1 showing the prior art system of replenishing electrolyte;

DESCRIPTION OF THE PREFERRED EMBODIMENTS

Figure 5:
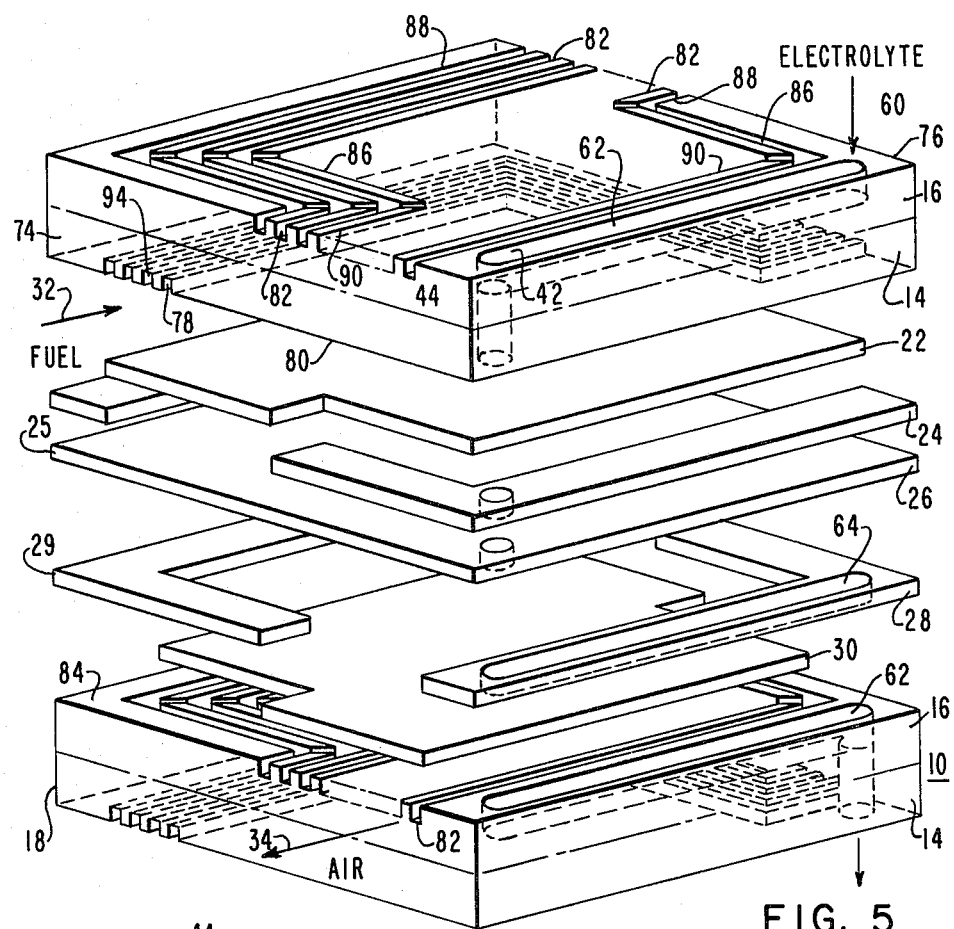
FIG. 5 is a perspective view of a single fuel cell according to the invention forming one of the fuel cells of the fuel cell stack of FIGS. 4 and 5.

Referring now in detail to the drawings, a single fuel cell 10 forming part of a fuel cell stack 12 generally includes two half bipolar plates 14 and 16 which also form end plates when the cell is used as the first or last cell of the fuel cell stack. Of course, where a plurality of fuel cells 10 are used to form fuel cell stack 12, half bipolar plates 14 and 16 are, for descriptive purposes, adjacent to each other and form bipolar plates 18 which are used to separate the intermediate cells. As best seen in FIG. 5, half bipolar plates 14 and 16 are formed together at the dashed outline to form the single bipolar plates 18, and if only a single cell is to be used, plate 16 is omitted from the top of cell 10 and plate 14 is omitted from the bottom of cell 10 so that the top and bottom of the half bipolar plates 14 and 16 have smooth outer facing surfaces as in FIG. 1.

Single cell 10 also includes in seriatum, anode electrode 22 and shims 24, 25 (if necessary to take up inequities because of the bipolar plates, excess space or if insulation is required); matrix 26; cathode electrode 30 and shims 28, 29 between bipolar plates 18 or half bipolar plates 14 and 16. Fuel flow is indicated by arrow 32 and air or oxidant flow is indicated by arrow 34.

Referring now more particularly to FIGS. 1 and 2, which shows the prior art fuel cell 10 and the prior art fuel cell stack 12 employing the fuel cells 10 in stack 12, and provided with acid electrolyte fill holes 36, 38 and acid electrolyte channel 40, the acid or electrolyte channel 40 is illustrated in half-bipolar plate 14 at the bottom of the fuel cell; if a shim is used, the shim is provided with a through cylindrical opening which opens into channel 40 and merely forms an extension thereof as shown in FIG. 5. The electrolyte is added through the fill holes 36 and 38 depending how the fuel cell stack is positioned. As the stack is positioned with vertical bipolar plates to add electrolyte, the fill holes 36, 38 are horizontally oriented at the bottom of the stack, and the excess electrolyte exits through the opposite end of fill holes 36, 38. The fuel stack 12 is then arranged with anode electrode 22 and cathode electrode 30 in a vertical plane with the acid at the bottom edge of the electrodes. Wicking must then take place against the gravity field, and this results in a slow wicking process. Nevertheless, structurally, it is desirable and preferable for tall stacks to be operated with the electrodes in a horizontal plane. Therefore, with acid feed of FIGS. 1 and 2, rewicking of the matrix requires removal of the stack from its normal operating position to lay the fuel cell stack on its side.

Turning now to the invention shown in FIGS. 3 to 6, the acid channel arrangement according to the invention includes a fill hole 42 with the direction of filling being indicated by arrow 44, and proceeds alternately from side or edge 46 to 48 and back with flow in the first cell taking place in the direction of arrow 50 (FIG. 3), then with second cell in the direction of arrow 52 and in the third cell in the direction of arrow 54, and then the acid or electrolyte exits through exit opening 56.

Figure 3:
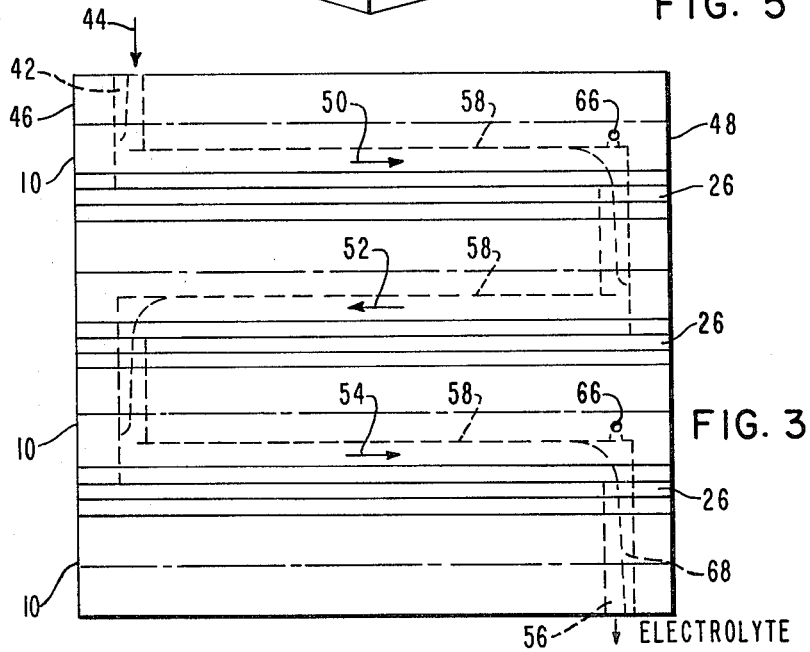
FIG. 3 is an elevational view of a fuel cell stack employing the fuel cell of FIG. 5 according to the invention, details of the cells being omitted for purpose of clarity.
Figure 4:
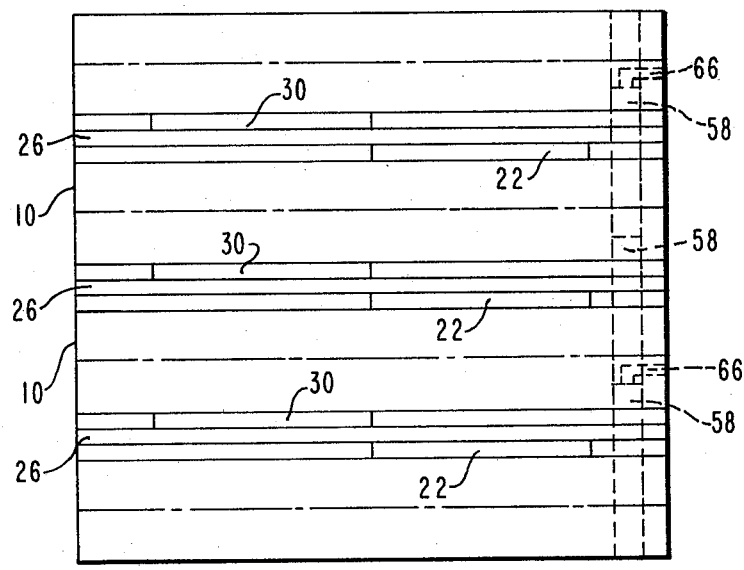
FIG. 4 is a side elevational view of the fuel cell stack of FIG. 4.

Referring now more particularly to FIGS. 3 and 4, in which the matrix 26 is on the bottom side of acid channel 58 so that the matrix will always be wet so long as some acid is in the acid channel, and thus direct wetting takes place.

In FIG. 5, the single cell 10 is shown with an acid channel 62 below the matrix. Accordingly, for this purpose, the acid which is fed through hole 42 can be supplied from the cell (not shown in FIG. 5) just above it, and the electrolyte indicated by arrow 60 flows into channel 62 in the half bipolar plate portion 16 of bipolar plate 18. As noted, the bottom bipolar plate 18 is beneath matrix 26, and when shim 28 is used, a cut through channel 64 is provided. Of course, when cell 10 of FIG. 5 is operated as the cells of the fuel stack of FIGS. 3 and 4, channel 64 is above matrix 26 and is similar to acid channel 58 so that matrix 26 is directly wetted, rather than being wetted by capillary action in FIG. 5 with the channel 62 below the matrix 26.

In the system for supplying electrolyte 60, fuel 32 and an oxidant or air 34 to the fuel cell stack 12 formed of fuel cells 10, fuel channels 78 and oxidant or air channels 82 formed in the bipolar plate 18 separating each pair of adjacent fuel cells and electrolyte channel 62 is connected to fill path or fill hole 42 for adding electrolyte to the cells and wetting the matrices 26, and the elecrolyte is flowed through the fuel cell stack in the serpentine or back and forth fashion in channel 62 substantially parallel to one face of opposite faces of bipolar plate 18 exposed to the matrices 26, and the fuel 32 and the oxidant 34 are from a first side or edge 74 of said bipolar plate to a second side 76 of bipolar plate 18 through fuel channels 78 formed in face 80 and air channels 82 formed in the opposite face 84 of bipolar plate 18, the fuel 32 flowing through channels 78 cut into face 80 in a first direction and the oxidant 34 flowing through channels 82 cut into the opposite face 84 in a direction counter-current or opposite to each other.

For example, channels 82 are each double L or Z-shaped and include a common leg 86 and a pair of bases 88 and 90 connected to opposite ends of leg 86. Base 88 starts at side 76 at the oxidant inlet end and base 90 is connected to common leg 86 to exit the oxidant at side 74.

In a similar manner, fuel channels 78 are L-shaped and include a common leg 92 shown in dashed outline, with a first base portion 94 at side 74 which is the fuel entrance side and a second base portion 96 at the fuel exit side 76. Many other fuel and oxidant flow path configurations can be utilized.

Optional vents 66 as shown in FIGS. 3 and 4 are desirable to assure that a continuous column of acid does not develop. Preferably, such vents are located periodically throughout the fuel stack. For certain purposes, the initial addition of acid to the acid electrolyte reservoir channels can be speeded up when some of the vents 66 are used as extra feed ports.

Figure 6:
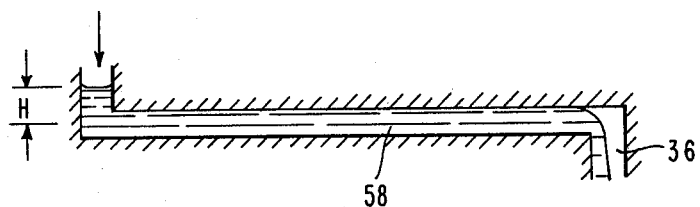
FIG. 6 is a schematic view of one of the channels to indicate the operation of the invention.

FIG. 6 is provided to explain the operation of the channels 58 and 62. When acid is added at a slow rate, the head H is sufficient to supply the pressure drop for flow along the channel 58. At the exit end, flow spills over the edge into the channel below. When the flow rate is set such that the head H is less than the vertical distance between acid channels, each channel will be exposed to a static head less than the thickness of a cell. The exit hole 68 (FIG. 3) may be elongated to avoid formation of bubbles or surface tension effects at the spillover from channel to channel. Preferably, the vertical portion of the electrolyte flow path between consecutive electrolyte channels has a width which is larger than the depth of the electrolyte channel to alleviate or avoid the formation of bubbles and surface tension effects particularly at the location of spillover from one electrolyte channel to the next.

Since the wicking flow rate into each matrix is extremely low, it is possible to supply acid to a stack containing a large number of cells using this system.

With the back and forth flow of electrolyte in a substantially serpentine fashion, initial filling of the acid channels is rapid and would occur, for example, in a few hours. Then wicking action saturates the matrices more rapidly with the matrix in the horizontal plane, as disclosed, than in the vertically oriented wicking systems of the prior art. And, the prior art did not allow replenishment of electrolyte on-line.

While there has been described what is considered to be the preferred embodiments of the present invention, it will be obvious to those skilled in the art that various changes and modifications may be made therein without departing from the scope of the invention.

I claim:

1. In a system for supplying electrolyte, fuel and an oxident to a fuel cell stack having at least two fuel cells, each of said cells having a pair of spaced electrodes and a matrix sandwiched therebetween, fuel and oxidant paths associated with a bipolar plate separating each pair of adjacent fuel cells and an electrolyte fill path for adding electrolyte to said cells and wetting said matrices, the improvement comprising:

means for flowing electrolyte through said fuel cell stack in a back and forth fashion in a path in each cell substantially parallel to one side of opposite sides of said bipolar plate, exposed to said matrices to produce a head on each said matrix less than the thickness of a cell due to frictional pressure drop in said path to thereby avoid flooding of said electrodes.

2. In the system as claimed in claim 1, wherein said bipolar plate includes an electrolyte channel formed into a face thereof adjacent said matrix.

3. In the system as claimed in claim 2, wherein said electrolyte channel is below said matrix for wetting thereof by capillary action.

4. In the system as claimed in claim 2, wherein said electrolyte channel is above said matrix for wetting thereof directly.

5. In the system as claimed in claim 1, wherein said bipolar plates and said electrodes are oriented in a horizontal position, and said bipolar plates include an electrolyte channel formed into each said bipolar plate for flowing the electrolyte in said electrolyte path in a horizontal direction to permit the addition of the electrolyte with the bipolar plate and the electrodes in a horizontal position.

6. In the system as claimed in claim 5, wherein said bipolar plates include an electrolyte fill opening extending through said bipolar plate in a vertical direction and communicating with said electrolyte channel for adding liquid electrolyte to said electrolyte channels with said bipolar plate and said electrodes oriented in said horizontal direction.

7. In the system as claimed in claim 6, including at least one vent to permit a more rapid adding of the electrolyte to said electrolyte channels.

8. In the system as claimed in claim 7, wherein, during filling, a head created by the rate of fill is less than the distance between said electrolyte channels, each said electrolyte channel is exposed to a static head less than the thickness of said bipolar plate, and wherein a vertical portion of said path between consecutive electrolyte channels has a width which is larger than the depth of the electrolyte channel to alleviate formation of bubbles and surface tension effects at spillover from one electrolyte channel to a next electrolyte channel.

9. In a fuel cell stack having at least two fuel cells, each said cell including in a horizontal orientation an anode electrode, a cathode electrode and a matrix between said electrodes, a top half-bipolar plate, a bottom half-bipolar plate and a bipolar plate for each two adjacent cells in said fuel stack, said bipolar plate having a top half portion and a bottom half portion, the top portion of said bipolar plate acting as said bottom half-bipolar plate and the bottom portion acting as said top half-bipolar plate, one of said fuel cells being sandwiched between said top half bipolar plate and said bipolar plate, and another of said fuel cells being sandwiched between said bipolar plate and said bottom half-bipolar plate, a fuel path and an oxidant path each extending in a horizontal direction, and electrolyte conduit supply means for supplying electrolyte and filling said fuel cells with electrolyte, the improvement comprising:

said conduit means for supplying electrolyte to said fuel cells including a path extending in a back and forth serpentine manner through said half-bipolar plates and said bipolar plate and said matrices in a first direction substantially vertically and transverse to said fuel path and said oxidant path, in a second direction substantially parallel to said matrices and said fuel and said oxidant paths, in a third direction substantially vertically and substantially parallel with said first direction, in a fourth direction with a direction of electrolyte flow opposite to said second direction and substantially parallel thereto, and then in a fifth direction substantially aligned with said first direction to produce an overall head uniformly between cells due to frictional pressure drop in said path for each said cell free of a large hydrostatic head to thereby avoid flooding of said electrodes.

10. In the fuel cell stack as claimed in claim 9, wherein said bipolar plate and said top half-bipolar plate each include a channel for the flow of said electrolyte adjacent to said matrices in said horizontal orientation.

* * * * *